May 24, 1960   L. M. FORSYTH   2,938,120
X-RAY FILTER GRID ASSEMBLY AND ACTUATING MEANS THEREFOR
Filed Dec. 2, 1957   3 Sheets-Sheet 1
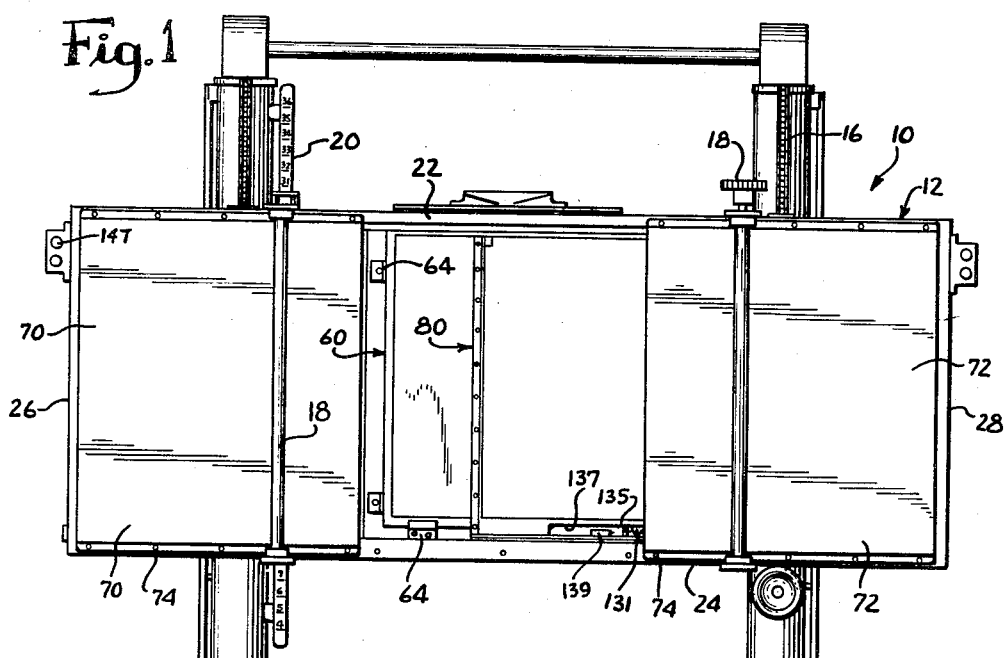
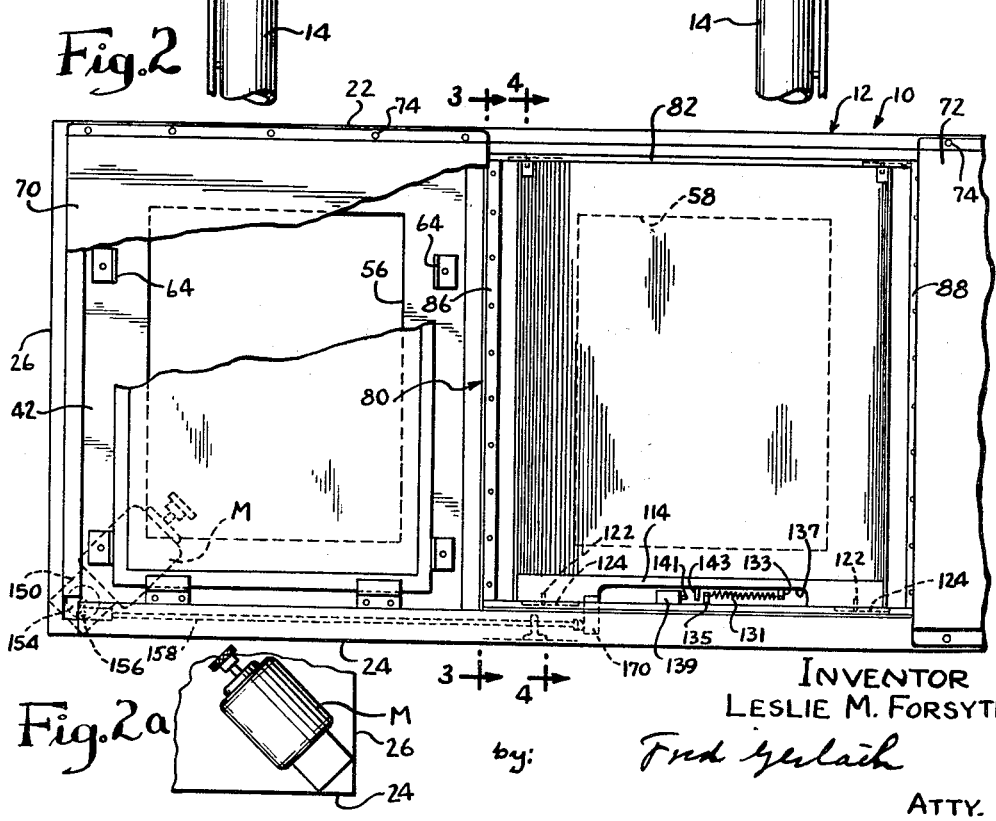
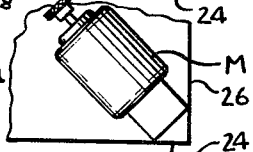
INVENTOR
LESLIE M. FORSYTH
by: Fred Gerlach
ATTY.

May 24, 1960  L. M. FORSYTH  2,938,120
X-RAY FILTER GRID ASSEMBLY AND ACTUATING MEANS THEREFOR
Filed Dec. 2, 1957  3 Sheets-Sheet 2
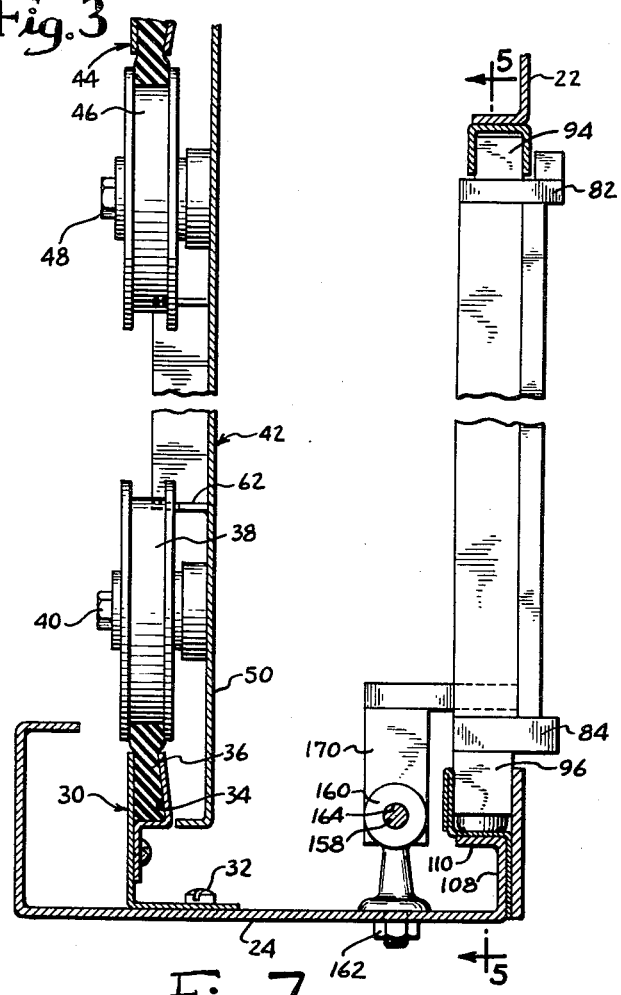
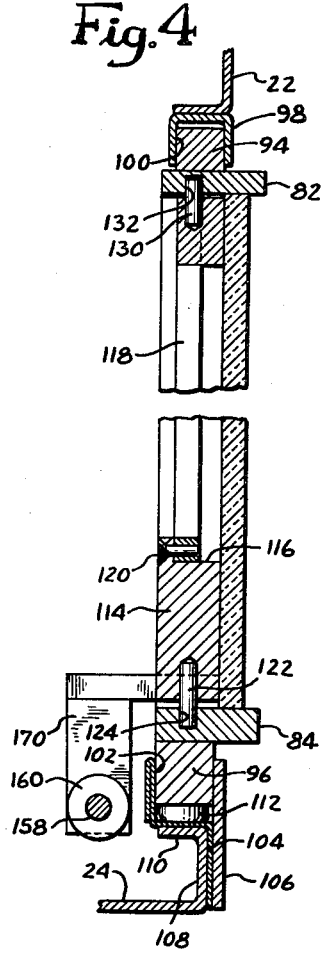
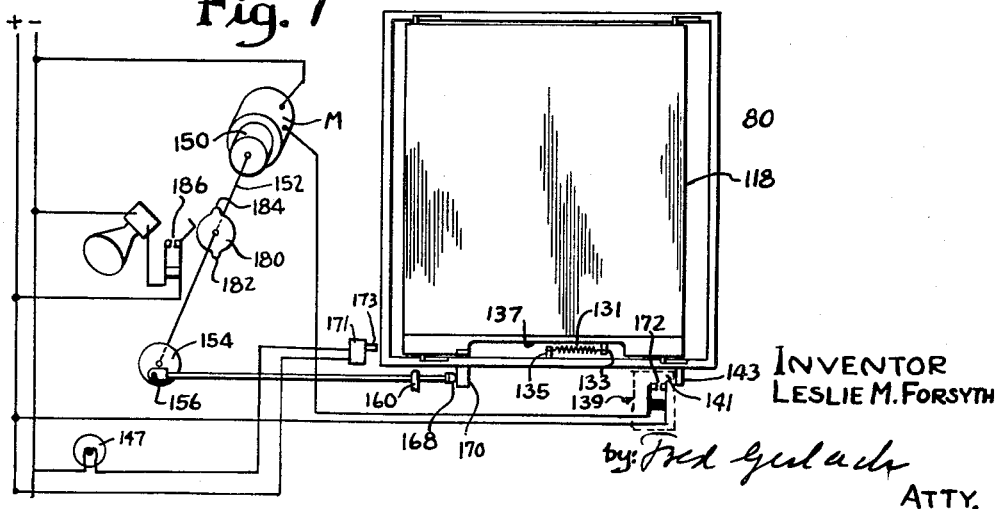
INVENTOR
LESLIE M. FORSYTH
by Fred Gerlach
ATTY.

May 24, 1960   L. M. FORSYTH   2,938,120
X-RAY FILTER GRID ASSEMBLY AND ACTUATING MEANS THEREFOR
Filed Dec. 2, 1957   3 Sheets-Sheet 3
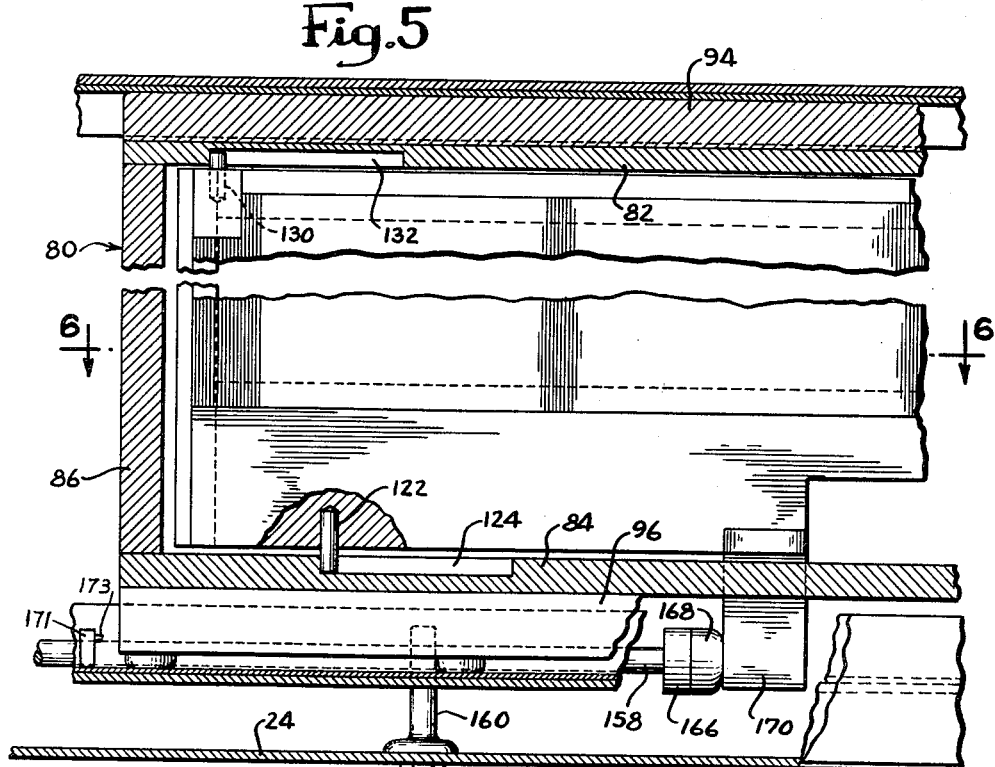
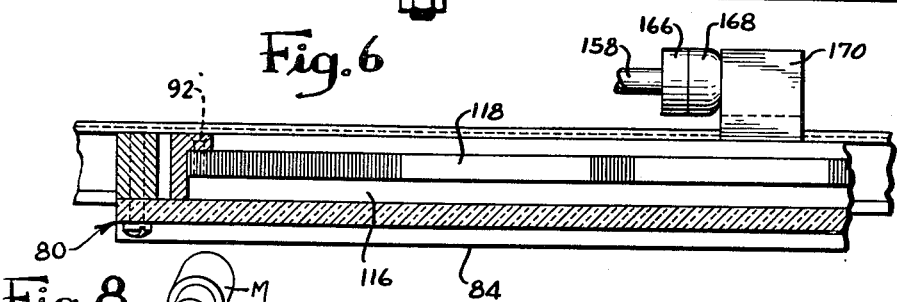
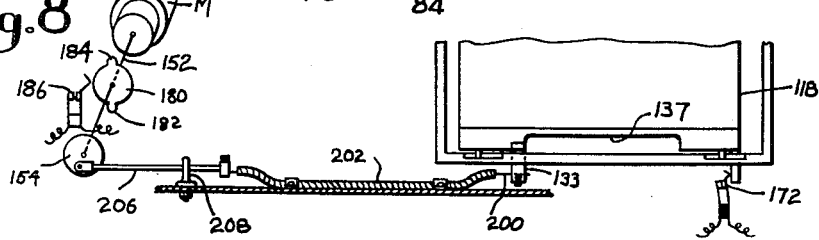
INVENTOR
LESLIE M. FORSYTH
by: Fred Gerlach
His ATTY.

United States Patent Office 2,938,120
Patented May 24, 1960

2,938,120

X-RAY FILTER GRID ASSEMBLY AND ACTUATING MEANS THEREFOR

Leslie M. Forsyth, 407 S. Kilbourn Ave., Chicago, Ill.

Filed Dec. 2, 1957, Ser. No. 700,097

8 Claims. (Cl. 250—62)

The present invention relates to X-ray photography and has particular reference to a novel form of filter grid assembly and actuating means therefor which, when embodied in a complete photographic machine or apparatus, includes a movable grid comprised of a material suitable for passing primary radiation but excluding secondary radiation, together with means for effecting motion of the grid during the exposure period.

Filter grid structures of the character briefly outlined above are well known in the art and such a grid consists of a plurality of thin strips of lead or other material which are opaque with respect to X-rays and which are arranged in the grid structure on edge and in spaced relationship. The grid is interposed between the subject undergoing radiography and the photographic film and the slits or voids between the adjacent lead strips will permit direct radiations to pass but they will exclude radiations which approach the grid obliquely along paths which are beyond the angle of acceptance delineated by the slits. Thus, the secondary radiations which normally arise due to diffusion of the X-rays passing through the subject, and which ordinarily would blur the image on the photographic film, are screened by the grid and only such primary radiations as may pass directly from the X-ray tube, through the subject and directly through the delineated slits may reach the film for exposure purposes.

In order to prevent the opaque strips of the filter grid from casting shadows upon the photographic film and producing in the developed film an undesirable image of the grid, it is conventional practice to move the grid in a plane parallel to the photographic film during the time that the exposure is being made and at a rate of travel which is sufficiently fast that the moving shadow cast upon the photographic film does not have an increment of time dwell on any given area of the X-ray sensitive film sufficient to present discernable shadow effects or grid lines on the film or otherwise interfere with the proper application of the desired shadow-image on the film during the entire exposure time.

An additional limitation that is attendant upon the use of moving filter grids of this nature arises from the stroboscopic effect which frequently is presented as a result of the 60 cycle pulsating nature of the X-ray emissions from the X-ray tube source. Where successive X-ray pulsations take place when adjacent opaque grid strips assume the same relative positions over the face of the photographic film, then the strips, although in actual movement will create stroboscopic shadow effects on the film which do not differ appreciably from stationary shadow effects. Such a condition is referred to as "synchronism."

Heretofore, various movable filter grid arrangements, together with actuating mechanism for moving the same have been devised and many of these grid arrangements and actuating mechanisms have taken into consideration the matter of synchronism and are equipped with special mechanism whereby the rate of travel of the filter grid may be controlled to avoid synchronous conditions during a wide range of exposure periods. X-ray equipment having associated therewith moving filter grid arrangements and motivating means therefor is designed for many uses and the form which the various assembled units will assume is as varied as the uses for which the units are designed. Among the more common X-ray equipment employing movable filter grids are X-ray tables, radiographic and fluoroscopic tables, radiographic wall units and cassette changers but there are other units of special design and employed for specific purposes which employ movable filter grids and actuating means therefor. All equipment of this type must necessarily involve an appreciable amount of mechanical structure beyond the photographic film itself and its associated filter grid since the grid must be guided in its movements across the face of the photographic film, i.e., in a plane parallel to the film, and there must be some mechanism, usually an electric motor and a power train extending between the motor and the grid which is to be moved.

Present day X-ray equipment having movable filter grid structures associated therewith invariably utilizes an overall frame structure containing the photographic film cassette and the movable grid assembly, as well as the motivating means for reciprocating or otherwise moving the grid assembly, whether this means be an electric motor and power train extending therefrom, solenoid devices or other equipment. Thus, particularly in the case of conventional cassette changers, shifting of the frame into and out of register with the exposure region of the apparatus has occasioned movement of the entire drive mechanism bodily, including the electric motor, solenoid or other prime mover.

Present day X-ray equipment of the character briefly outlined above is possessed of numerous disadvantages, principal among which is the fact that it consumes a large proportion of the available space in the vicinity of the photographic film, thus limiting the movements of the subject and, in many instances, preventing positioning of the subject in the most appropriate position for X-ray exposure. Additionally, such equipment is bulky and the fact that it is housed inappropriately within a structure which itself is movable, renders it subject to damage due to shock. Still further, such frame-enclosed grid actuating structures are not readily accessible for purposes of inspection, adjustment or repair. Another disadvantage of structures of this nature resides in the fact that the power train extending between the electric motor or other prime mover and the grid proper is a permanent one so that, if provision is made for shifting the grid assembly from one region of the apparatus to another region, for example to an out-of-the-way position when it is not required, the entire assembly of mechanism for moving the grid must likewise be shifted with the grid so as to not disturb the operative relationship between the grid and its driving mechanism.

Additional limitations are imposed upon the use of such conventional movable grid structures in that many of them are provided with adjusting means and various controls whereby undesired synchronization, as outlined above, may be obviated utilizing control structure whereby the movements of the grid may be timed with the frequency of the impulses applied to the X-ray tube to produce the primary X-rays, or whereby the amplitude of reciprocation of the grid may be varied or whereby the movements of the grid may be regulably varied or timed for any reason whatsoever. These adjusting means and controls are similarly closely and permanently associated with the actual power train extending to the grid and they too are movable bodily with the grid assembly when the latter is moved from one position to another, for example from an operative position in register with the photographic plate to an out-of-the-way position. They also consume space in the vicinity of the photograph plate and further limit the proper placement of the subject in position for effective X-ray exposure.

The present invention is designed to overcome the above noted limitations that are attendant upon the use of conventional X-ray apparatus employing reciprocating or otherwise automatically movable filter grid assemblies and, toward this end, it contemplates the provision of a novel grid assembly and actuating means therefor wherein the actuating means for the movable grid assembly is physically and functionally separate and detached from the latter and is permanently mounted in position in the apparatus in such a manner that the grid may be brought into operative association therewith or withdrawn from such association at will. By such an arrangement it is possible to position the driving motor and its associated train of driving mechanism permanently at one region of a piece of X-ray equipment such as a radiographic table, wall unit, cassette changer or other device, and to position the movable grid in another region of the equipment, with both the drive mechanism and grid assembly being disposed in out-of-the-way positions wherein they are remote from the exposure region of the photographic plate or film assembly, and to thereafter, at will, bring the movable grid assembly into proper register with the photographic plate and, at the same time, into operative cooperation with the grid drive mechanism preparatory to making the X-ray exposure.

The provision of an X-ray filter grid assembly and actuating means therefor of the character briefly outlined above being among the principal objects of the invention, a further object is to provide an apparatus of this character which, due to the absence of cumbersome motor driving mechanism and auxiliary control devices associated therewith, will enable the movable grid assembly to be positioned for reciprocation in a plane which is closer to the plane of the photographic plate than had heretofore been possible, thereby resulting in an overall unit which is extremely thin and compact.

Another object of the invention is to provide an apparatus of this character in which the grid driving mechanism may be mounted in a convenient out-of-the-way position on the stationary X-ray machine framework wherein it is conveniently accessible for purposes of inspection, adjustment, replacement of parts, and repair, without requiring dismantling or partial dismantling of the remainder of the apparatus.

A still further object of the invention is to provide a movable grid and driving means therefor wherein the entire driving assembly is permanently mounted in one position on the framework of a piece of X-ray equipment such as a cassette changer or the like, and wherein the movable grid assembly is bodily movable as a unit into and out of operative register with the driving mechanism so that, when the grid is brought into an operative position with respect to the photographic plate associated with the apparatus, the necessary movements of the grid will be automatically initiated without requiring special hook-up operations between the grid assembly and the drive mechanism.

Yet another object of the invention is to provide a movable grid assembly and driving means therefor wherein the motion which is applied to the grid is non-uniform and of a constantly changing nature in that, at any given instant, the movement of the grid is either accelerating or decelerating, together with novel means whereby the time period for each individual exposure is automatically correlated with the movements of the grid so that the exposure takes place only during the faster increments or decrements of grid motion and will automatically terminate at such time as the speed of the grid falls below a predetermined minimum.

Another object of the invention is to provide an X-ray apparatus in the form of a cassette changer having the usual framework in which the cassette is selectively slidable between an operative exposure position in register with the X-ray tube and a retracted inoperative shielded position in a space provided for it which is displaced laterally from the operative exposure position, and in which the grid structure is likewise selectively slidable as a unit between an operative position where it is in register with both the cassette and tube in the operative position of the former and an inoperative position wherein it is disposed within the shielded space provided for the cassette, together with means whereby, when the grid structure is moved to its operative position it will automatically become operatively connected to a grid driving mechanism for reciprocation in the exposure area and whereby when it is moved to its operative position it will become disassociated from such driving mechanism and become immobile in the shielded space.

The provision of a filter grid assembly and actuating means therefor which is of a materially simplified nature and which therefore consumes but little space within the X-ray apparatus with which it is associated; one which is comprised of a minimum number of moving parts and which therefore is unlikely to get out of order; one which is rugged and durable and which therefore is possessed of a relatively long life; one in which the component parts thereof require no complicated or special machining operations and which therefore may be manufactured at a relatively low cost; one which is smooth and silent in its operation; one which is capable of ease of assembly and disassembly; one which is attractive in its appearance and pleasing in its design; and one which otherwise is well adapted to perform the services required of it are further desirable features which have been borne in mind in the production and development of the present invention.

Other objects and advantages of the invention, not at this time enumerated, will become more readily apparent as the nature of the invention is better understood.

In the accompanying three sheets of the drawings, forming a part of this specification, a preferred embodiment of the invention has been shown.

In these drawings:

Fig. 1 is a fragmentary front elevational view of a floor-base mounted cassette changer constructed in accordance with the principles of the present invention.

Fig. 2 is an enlarged fragmentary front elevational view of a portion of the cassette changer mechanism proper, certain portions of the mechanism being broken away to more clearly reveal the nature of the invention.

Fig. 2a is a fragmentary rear elevational view of a portion of the cassette changer framework in the vicinity of a driving motor employed in connection with the present invention.

Fig. 3 is a sectional view taken substantially along the line 3—3 of Fig. 2.

Fig. 4 is a sectional view taken substantially along the line 4—4 of Fig. 2.

Fig. 5 is a sectional view taken substantially along the line 5—5 of Fig. 3.

Fig. 6 is a sectional view taken substantially along the line 6—6 of Fig. 5.

Fig. 7 is a schematic view illustrating the operation of the grid assembly and its actuating means and including a circuit diagram for the electrical instrumentalities associated with the present invention, and Fig. 8 is a schematic view similar to Fig. 7 illustrating the operation of a modified form of grid actuating mechanism.

Referring now to the drawings in detail, and in particular to Fig. 1, the improved filter grid assembly and actuating means therefor has, purely for exemplary purposes, been illustrated as being operatively associated with a cassette changer apparatus designated in its entirety at 10, and in which the cassette changer proper is embodied in a frame-like structure 12 operatively supported on standards 14 which may, in turn, be supported by suitable base supports (not shown) capable of attachment to a floor or other supporting surface. The assembly 12 is capable of being vertically adjusted on the standards 14 in the usual manner of mounting such cassette changer units, by means of suitable supporting chain 16 and adjusting mechanism 18 and the desired adjustments may be effected with reference to a suitable scale 20 or the like. The details of the supporting and adjusting mechanism for the unit 12 forms no part of the present invention and have not been completely illustrated herein, it being understood of course that other mechanism may be employed and that unit 12 may be mounted upon a wall or otherwise appropriately supported in its operative relationship with respect to an X-ray tube for proper exposure of the photographic film associated with the cassette or cassettes by means of which they are positioned in the unit 12.

The unit 12 involves in its general organization a generally rectangular stationary framework including upper and lower frame members 22 and 24 respectively, and vertical side members 26 and 28 which extend between the members 22 and 24, thus providing a generally flat rectangular frame structure which is elongated horizontally. The frame members 22 and 24 are of the small width so that the frame structure as a whole is relatively thin, considering its horizontal and vertical dimensions, and all of the operative equipment associated with the cassette changer apparatus including the improved movable grid assembly and its actuating means are contained substantially within the confines of the relatively narrow rectangular framework described above.

As best seen in Figs. 2 and 3, a guide rail assembly 30 is secured as at 32 to the inside upper face of the frame member 24 adjacent the rear side thereof and presents an upwardly opening channel 34 in which there is disposed a lower guide rail proper 36 which may be formed of rubber or other suitable elastomeric material and on which there is adapted to travel a pair of flanged rollers 38 mounted on stub shaft assemblies 40 carried at the lower corner regions of a vertically slidable cassette-supporting frame 42 of rectangular design. A similar guide rail assembly 44 is supported from the underneath horizontal surface of the top frame member 22 and is designed for cooperation with a pair of flanged rollers 46, similarly mounted on stub shaft assemblies 48 carried at the upper corners of the frame 42. The frame 42 is in the form of a flat plate 50 through which there extends a pair of spaced rectangular openings 56 and 58 respectively (Fig. 2), each opening being adapted to receive thereover a conventional film cassette assembly 60. The openings 56 and 58 are bounded by rearwardly extending marginal reinforcing flanges 62 which lend rigidity to the plate 50 as a whole. A plurality of spring clip devices 64 are provided on the front face of the plate 50 in the vicinity of the openings 56 and 58 and are adapted to removably receive the cassettes 60 and position them on the front face of the plate 50 with their marginal regions overlapping the boundaries of the rectangular openings and with the medial regions of the cassettes extending completely across and closing the openings 56 and 58. A pair of imperforate X-ray impervious shield plates 70 and 72 are secured by fastening screws 74 or the like to the rear side of the upper and lower frame members 22 and 24 at opposite ends of the framework. These shield plates 70 and 72, when in position on the framework, define therebetween an open central region which constitutes the exposure region of the X-ray apparatus and into which the two cassettes 60 carried by the frame 42 are adapted to selectively be positioned for exposure purposes. Accordingly, the frame 42 is slidable horizontally in the outer stationary framework of the structure 12 on the guide rail assemblies 30 and 44 between an extreme left hand position as viewed in Figs. 1 and 2 wherein the opening 56 and cassette 60 extending thereacross are disposed directly behind the shield plate 70 and wherein the opening 58 and cassette 60 associated therewith is disposed in the central exposure region of the apparatus, to an extreme right hand position wherein this latter opening 58 and cassette 60 are disposed immediately behind the shield plate 72 while the opening 56 and its associated cassette 60 is disposed in the central exposure region of the apparatus.

The arrangement of parts thus far described is more or less conventional and the illustrated and above-described arrangement whereby plural cassette assemblies are removably mounted on a reciprocable cassette supporting frame for the purpose of being selectively brought into register with the exposure region of an X-ray apparatus are well known and no claim is made herein to any novelty associated with the same. It will be understood of course that such cassette mountings have associated therewith suitable automatic means, not illustrated herein, whereby the cassette frame 42 may be shifted between its extreme positions to bring one or another of the cassettes into operative register with the X-ray tube of an X-ray apparatus. The present invention resides rather in the novel filter grid assembly and its actuating means whereby the grid may be selectively moved into and out of register with the exposure region of the apparatus and, when it is moved into register with this region, the actuating means therefor will automatically become effective to impart reciprocal or other motion to the grid, all in a manner that will now be described in detail.

The filter grid assembly or unit 80 is in the form of a rectangular frame structure including upper and lower horizontal frame bars 82 and 84 respectively and vertical side bars 86 and 88 respectively. The upper and lower frame bars 82 and 84 have secured thereto guide rails 94 and 96 respectively (see also Figs. 3 and 4), the upper rail 94 sliding in an inverted U-shaped channel member 98 providing a guideway 100 and the lower rail 96 sliding in a similar guideway 102 provided in a composite channel assembly including a generally Z-shaped channel piece 104 and a front channel plate 106. The assembly is suitably secured to the front face of an upturned flange 108 provided on the member 24 and to an inturned flange 110 provided on the upturned flange 108. A series of anti-friction feet 112 carried on the underneath side of the rail 96 serves to bear the weight of the entire filter grid assembly, as well as to reduce friction when the assembly is slid horizontally in the guide ways 100 and 102 provided for it in the outer stationary frame member of the cassette change proper 12.

Mounted for a limited reciprocal movement within the frame boundary defined by the frame bars 82, 84, 86 and 88 is an inner grid frame 114 in the form of a rectangular metal plate having a medial rectangular opening 116 extending therethrough. The grid proper 118 which is of conventional design, consists of a plurality of strips 92 of an opaque material which is impervious to X-rays arranged in parallel on edge spaced relation to one another. This grid proper is secured in the opening 116 by means of suitable marginally arranged anchoring screws 120. The frame or plate 114 lies wholly within the confines of the four frame members 82, 84, 86 and 88 and as shown in Figs. 2, 4 and 5, the plate 114 is supported and guided in its oscillatory motion by means of a pair of downwardly projecting fingers 122 which extend into a pair of longitudinally extending grooves 124 provided in the lower frame member 84. The two pins 122 bear the entire weight of the grid plate 114 and its associated grid proper 118 and the lower ends of these pins present friction surfaces of limited area whereby the grid plate 114 is slidable in opposite directions throughout a limited extent as defined by the grooves 124 with a minimum of effort. The upper regions of the grid plate 114 are guided by means of a pair of pins 130 similar to the pins 122, which project upwardly beyond the upper edge of the grid plate and extend into longitudinally extending slots 132 formed in the upper frame member 82.

The grid plate 114 is normally biased toward the extreme left hand position of which it is capable of assuming within the encompassing frame by means of a tension spring 131 (Figs. 1 and 2), one end of which is secured to a pin 133 which depends from the grid plate 114 and the other end of which is secured to an upwardly projecting pin 135 carried on the frame member 84. To accommodate the spring 131 and pins 133 and 135, the lower edge of the grid plate 114 is provided with an undercut 137 which provides a clearance region for the various parts. A switch assembly which may be in the form of a conventional microswitch 139 of the normally open single contact variety is mounted within the undercut 137 and has an operating finger 141 designed for engagement with an actuating pin 143 carried by the grid plate 114. The nature and function of the switch assembly 139 will be set forth presently.

In the above description of the cassette changer assembly 12 thus far, reference has been made to four rectangular frame structures. These structures are the stationary all-encompassing frame structure including the frame members 22, 24, 26 and 28, the laterally shiftable cassette-carrying frame 42 having the openings 56 and 58 therein, the outer laterally shiftable filter grid assembly frame including the frame members 82, 84, 86 and 88, and the inner reciprocable filter grid frame which comprises the plate 114 having the rectangular opening 116 therein in which the filter grid proper 118 is mounted. To avoid future confusion in terminology, the outside stationary frame will hereinafter be referred to as the cassette changer frame, the unitary frame 42 as the cassette carrying frame, the outside frame of the filter grid assembly as the filter grid frame, and the frame 114 which carries the filter grid proper 118 will be referred to simply as the filter grid.

The filter grid assembly 80 is adapted to be slid longitudinally of the cassette changer frame within the guideways 100 and 102 provided for it as previously described between a retracted position wherein it is substantially concealed behind the shield plate 72 at the right hand end of the changer 12 and an advanced position wherein it is disposed wholly within the exposure region between the two plates 70 and 72 centrally of the apparatus. The movement may be effected by manual means or, if desired, suitable automatic means may be provided for this purpose. In order to reciprocate the grid 114 within its encompassing grid frame when the latter is in its operative centered position within the exposure region of the apparatus, novel actuating means is carried by the stationary framework of the cassette changer 12 and this actuating mechanism is designed for cooperation with the grid 114 only when the grid frame is in such centered position. This actuating mechanism is best illustrated in Figs. 2, 5 and 6 and it also appears in the schematic representation of Fig. 7. The mechanism comprises an electric motor and gear reduction assembly including a motor M and gear reduction device 150 (see also Fig. 2a), the assembly being suitably supported on the frame members 24 and 28. The gear reduction device 150 is provided with an output shaft 152 having mounted thereon a disc 154 carrying a crank pin 156. A thrust rod 158 has one end thereof pivotally connected to the crank pin 156 and the rod extends along the lower frame member 24 above the level thereof and has its forward regions guided in a guide post 160, secured as at 162 to the bottom frame member 24. The rod 158 extends through an opening 164 in the guide post 160 and this opening provides sufficient clearance to allow for the angular movements of the rod 158 under the impelling influence of the crank arm 156. The free or distal end of the rod 158 carries thereon an enlarged head 166 to which there is secured a resilient bumper pad 168 formed of rubber or other similar resilient elastomeric material and designed for engagement with a depending finger 170 secured to the underneath side of the grid plate 114.

From the above description it will be seen that when the filter grid assembly is in its retracted position at the right hand side of the cassette changer assembly 12 behind the shield plate 72, the finger 170 will assume a position remote from the thrust rod 158. However when the filter grid assembly 80 is in its centered position within the exposure area of the apparatus between the two plates 70 and 72, the depending finger 170 will assume a position wherein it is within the "throw" of the rod 158 and, as the forward end region of the rod 158 slides through the guide post 160, the pad 168 will engage the finger 170 which is drawn against the pad under the influence of the spring 131 so that the finger 170 will follow the reciprocal movements of the pad 168, thus causing reciprocation of the grid 114 within its encompassing grid frame. The motion which is thus imparted to the grid 114 is a simple harmonic reciprocating motion, this motion being imposed upon the grid through the thrust rod 158 under the influence of the crank pin 156. The motion of the pad 168 is substantially linear, although the path of movement described by this pad has very small increments of vertical motion due to the rocking movement of the rod within the opening provided for it in the guide post 160. However, due to the fact that the guide post 160 is positioned at a region remote from the crank pin 156 and due to the fact that the vertical displacement of the crank pin 156 is not great, any vertical components of motion applied to the forward end of the rod 158 may be disregarded.

In order to disable the grid assembly actuating mechanism when the grid assembly 86 is in its retracted position, a microswitch 171 including a pair of normally open contacts 172 (Fig. 7) is mounted on the frame member 24 and has an actuating finger 173 adapted to remain engaged by a portion of the filter grid frame when the latter assumes its operative position in the exposure region of the apparatus. This condition of engagement occurs only when the grid assembly 86 is moved to its operative position in the exposure region of the apparatus and thus when the grid assembly is initially moved from a retracted position to its advanced operative position, closure of the contacts 172 will establish the motor circuit whereupon the motor will effect actuation of the thrust rod 158 through the train of mechanism previously described. Conversely, when the grid assembly 86 is withdrawn from its position of register with the exposure region, the assembly 86 will move away from the operating finger 173 so that the contacts 172 will move to their normally open position, thus deenergizing the motor circuit and disabling the actuating mechanism for the filter grid asesmbly.

Inasmuch as the reciprocal motion applied to the grid 114 within its encompassing grid frame is non uniform and of a simple harmonic nature, it is desirable that the X-ray exposure be initiated during a fragmentary portion of the movement of the grid 114 in one direction or the other at such time as the grid is either approaching or receding from its mid position so that synchronization arising from a static or near static condition of the grid will be avoided. The rate of rotation of the disc 154 is preferably such that the time consumed in making each half revolution of the disc is appreciably greater than the duration of any given X-ray exposure. For example the disc 154 may have a rotational speed of 90 r.p.m., whereas a given exposure has a duration of 1/10 of a second. In an instance such as this, means are provided whereby energization of the X-ray tube will be effected at a favorable point near the mid-stroke of the grid 114 in either direction where the rate of change speed of the grid is at a maximum. Accordingly, the output shaft 152 of the gear reduction device 150 has mounted thereon a cam 180 having formed on the periphery thereof a pair of cam protuberances 182 and 184, preferably arranged at diametrically opposed points. The protuberances 182 and 184 are designed for cooperation with a pair of normally open contacts 186 disposed in the electric circuit for the X-ray tube which has been designated in Fig. 7 at T. The circumferential positioning of the protuberances 182 and 184 relative to the crank pin may be effected so that the contacts 186 will become closed for the duration of an X-ray exposure at any appropriate region in the mid-stroke of the grid 114 in opposite directions. The contacts 186 may become closed only under the influence of the protuberance 182 when the grid is moving to the right as viewed in Fig. 7, or they may become closed only under the influence of the protuberance 182 when the grid is moving to the right as viewed in Fig. 7 or they may become closed only under the influence of the protuberance 184 while the grid is moving to the left. Alternatively, the contacts 186 may close at each half-revolution of the disc 154 under the influence of both protuberances 182 and 184. Closure of the contacts 186 may be effected immediately prior to arrival of the grid at its mid position or immediately thereafter or, in fact at any desired point in the grid cycle. By such an arrangement energization of the X-ray tube at a time when the grid is in a position of rest or at a time when the velocity of the grid is insufficient to obviate shadow effects on the film will be avoided.

The microswitch 139 which is disposed within the undercut 137 includes a pair of normally open contacts 145 adapted to become closed each time the pin 143 engages the operating finger 141, thus closing a circuit through a signal lamp 147 suitably disposed on the framework of the machine and causing the same to flash intermittently in timed relation to the movement of the grid 114.

In Fig. 8 a modified arrangement for reciprocating the grid 114 within its encompassing filter grid frame has been schematically shown. In this form of the invention, a Bowden wire arrangement including a movable wire core 200 within a flexible sheath 202 has one end fixedly but releasably attached to the depending finger 133 on the grid 114 while the sheath 202 is secured as at 204 to the lower stationary frame member 24. The other end of the wire core 200 is operatively connected to the crank pin 156 on the disc 154 through the medium of a connecting rod 206 which is guided in a guide post 208 on the frame member 24. Such an arrangement for reciprocating the grid is designed for use in connection with radiographic tables and similar X-ray apparatus where the cassette or other film carrying device is not laterally shiftable to an out-of-the-way position but its use in connection with a cassette changer having a shiftable cassette frame is also contemplated.

In compliance with Title 35, U.S. Code, Section 121, 122, a preferred form of the invention has been shown in the drawings and described herein, but it should be understood that the invention is not to be limited to the specific disclosure made. For example, while the X-ray sensitive media disclosed herein is shown as being in the form of a cassette-embodied film, it will be understood that the principles of the invention are applicable to all manner of X-ray sensitive media including fluorescent X-ray screens and the like. It will be understood that throughout this specification and in the claims the terms, "film," "plate" and the like are to be broadly construed as including other forms of X-ray-sensitive media including fluorescent screens.

Having thus described the invention, what is claimed is:

1. The combination with X-ray apparatus having a stationary framework providing a support for an X-ray sensitive film at an exposure region, a filter grid frame slidably disposed in said framework and movable endwise between a retracted position wherein it is out of register with said X-ray sensitive film and an advanced position wherein it is disposed at said exposure region and in register with the film, a filter grid slidably disposed within said frame for relatively small endwise movements in opposite directions, spring means connected to the filter grid frame and filter grid for yieldingly urging said filter grid in one of said directions within the frame, a thrust rod mounted on said stationary framework for reciprocation in substantially the directions of sliding motion of the filter grid frame as well as of the filter grid and having one end thereof disposed in the vicinity of said exposure region and having its other end at a region remote from the exposure region, a motor permanently secured to the stationary framework at said remote region, means at said remote region operatively connecting the motor and thrust rod for reciprocating the latter, and a follower member fixedly secured to the grid, said follower member being disposed out of the path of movement of said one end of the thrust rod when the filter grid is in its retracted position and being automatically movable into the path of movement of said one end of the thrust rod as said filter grid frame is moved to its advanced position.

2. A filter grid assembly adapted to be operatively interposed between a source of X-rays and a light-sensitive film associated with an X-ray apparatus, said assembly comprising a generally rectangular outer frame including longitudinally extending frame bars connected together at their ends by transverse frame bars, a generally rectangular movable filter grid disposed within the confines of said outer frame and substantially bridging the distance between the opposed longitudinally extending frame bars, means on said longitudinally extending frame bars providing opposed guideways in which a pair of opposite edges of the filter grid are guided for limited reciprocating movement of the filter grid longitudinally of said outer frame, one of said opposite edges being provided with an inwardly extending elongated transverse slot providing a relief space between the adjacent longitudinally extending frame bar and said one opposite edge, an attachment pin secured to said adjacent frame bar and projecting into said relief space, an attachment pin secured to said one opposite edge of the grid and likewise projecting into said relief space, a tension spring connected at its opposite ends to said pins respectively and serving to normally urge the grid longitudinally in one direction within the outer frame, and an actuating finger carried by the filter grid and projecting outwardly beyond the confines of said outer frame and designed for cooperating engagement with a movable actuator when the assembly is operatively interposed between said source of X-rays and said light-sensitive film.

3. A filter grid assembly according to claim 2 wherein said opposite edges of the filter grid are guided in said guideways by means of widely spaced anti-friction pins secured to the filter grid and projecting into said guideways.

4. A cassette changer of the character described comprising a generally rectangular framework including upper and lower longitudinal frame bars, and vertical side bars connecting the adjacent ends of said longitudinal bars, said framework presenting a central exposure region and a cassette-storage region on each side of the exposure region, a movable rectangular cassette-supporting frame disposed within said framework, a pair of cassettes removably mounted on said cassette-supporting frame in spaced edge-to-edge alignment and in the common plane of the frame, said frame being movable in opposite directions within the framework between one extreme position wherein one of said cassettes is disposed in operative register with the exposure region and the other cassette is disposed in one of said storage regions and another extreme position wherein the other cassette is disposed in operative register with the exposure region and said one cassette is disposed in the other storage region, a filter grid assembly slidably disposed within said framework and movable between one extreme position wherein it is disposed in front of said cassette-supporting frame in operative register with the exposure region and another extreme position wherein it is disposed in one of said storage spaces, said filter grid assembly comprising an outer rectangular frame and an inner filter grid mounted for limited reciprocation within the outer frame, means yieldingly urging said filter grid in one direction of its reciprocal path of movement, an actuator movably mounted on the stationary framework in the vicinity of said exposure region for limited reciprocation in opposite directions, means for reciprocating said actuator, and a follower member connected to the filter grid within the rectangular frame, said follower member being disposed out of the path of movement of said actuator when the filter grid is in its retracted position and being movable into said path of movement of the actuator as said filter grid assembly approaches its position of registry with the exposure region.

5. A cassette changer as set forth in claim 4 wherein said follower member comprises a finger fixedly secured to the filter grid and projecting outwardly beyond the confines of said filter grid frame.

6. A cassette changer according to claim 4 wherein said means for urging the filter grid in one direction comprises a tension spring having its opposite ends connected to the grid and frame respectively and wherein said follower member comprises a finger fixedly secured to the filter grid and projecting outwardly beyond the confines of said filter grid frame.

7. A cassette changer according to claim 4 wherein said actuator comprises a thrust rod mounted for sliding movement in opposite directions on said framework and having one end thereof designed for engagement with said follower, a drive shaft rotatably mounted on the framework, a disc mounted on said shaft, a crank arm eccentrically mounted on said disc, and means connecting the other end of the thrust rod to said crank arm.

8. A cassette changer according to claim 7 including additionally, a cam plate mounted on said drive shaft, a pair of contacts operable under the control of said cam plate between closed and open positions, said contacts being adapted to be positioned in the energizing circuit for the X-ray emission device of the cassette changer.

References Cited in the file of this patent

UNITED STATES PATENTS

| | | |
|---|---|---|
| 2,591,536 | Gieringer et al. | Apr. 1, 1952 |
| 2,668,913 | Goldfield et al. | Feb. 9, 1954 |
| 2,749,445 | Stava et al. | June 5, 1956 |
| 2,846,588 | Berger | Aug. 5, 1958 |